(12) United States Patent
Hollm et al.

(10) Patent No.: US 9,988,150 B2
(45) Date of Patent: Jun. 5, 2018

(54) CONTAINER FOR AN OXYGEN SUPPLY UNIT, DEVICE AND SYSTEM OF AN ARRANGEMENT OF A NUMBER OF OXYGEN SUPPLY DEVICES, WHEREIN EACH OXYGEN SUPPLY UNIT IS STORED IN A CONTAINER, METHOD OF CONTROL OF A STATUS AND/OR CHANGE OF STATUS OF A CONTAINER

(71) Applicant: Zodiac Aerotechnics, Plaisir (FR)

(72) Inventors: Marco Hollm, Rosdorf (DE); Hasso Weinmann, Lubeck (DE); Gunter Boomgarden, Scharbeutz (DE); Mark Niedostatek, Wenzendorf (DE); Rudiger Meckes, Berkenthin (DE); Wolfgang Rittner, Ahrensbok (DE)

(73) Assignee: Zodiac Aerotechnics, Plaisir (FR)

( * ) Notice: Subject to any disclaimer, the term of this patent is extended or adjusted under 35 U.S.C. 154(b) by 1089 days.

(21) Appl. No.: 13/893,511

(22) Filed: May 14, 2013

(65) Prior Publication Data

US 2014/0001062 A1    Jan. 2, 2014

Related U.S. Application Data

(60) Provisional application No. 61/665,534, filed on Jun. 28, 2012.

(51) Int. Cl.
*A62B 18/08* (2006.01)
*B65D 85/00* (2006.01)
(Continued)

(52) U.S. Cl.
CPC .............. *B64D 13/00* (2013.01); *B64D 11/00* (2013.01); *A62B 25/005* (2013.01); *B64D 2231/025* (2013.01)

(58) Field of Classification Search
CPC ...... B64D 11/00; B64D 13/00; B64D 11/003; B64D 2011/0053; B64D 2231/025;
(Continued)

(56) References Cited

U.S. PATENT DOCUMENTS 3,615,250 A     10/1971  Vernon
3,647,165 A  *   3/1972  Whitla ................. A62B 25/005
                                                              244/118.5
(Continued)

FOREIGN PATENT DOCUMENTS

GB            2480322 A      11/2011
WO       2010027822 A1        3/2010

OTHER PUBLICATIONS

Office Action in Chinese Application No. 201310269572.5, dated Feb. 24, 2016 English translation provided, 14 pages.
(Continued)

*Primary Examiner* — Luan K Bui
(74) *Attorney, Agent, or Firm* — Kilpatrick Townsend & Stockton LLP; Dean W. Russell

(57) ABSTRACT

A container for an oxygen supply unit is described. The container may have a container well, wherein a container door can be pivotably joined at a container well's edge, wherein the container is provided with a sensor system, adapted to indicate a status and/or change of status of the door, in particular relative to the well. A system of an arrangement of a number of oxygen supply devices in a ceiling-panel along an aircraft cabin, in particular along an aircraft cabin alley of seats, also is described, wherein each oxygen supply unit is stored in a container.

12 Claims, 4 Drawing Sheets

(51) Int. Cl.
*B64D 13/00* (2006.01)
*B64D 11/00* (2006.01)
*A62B 25/00* (2006.01)

(58) Field of Classification Search
CPC ...... G08H 13/08; G08B 13/1436; B25H 3/02; B65D 2203/10; A62B 7/14; A62B 25/005
USPC ............ 244/118.5, 119; 128/202.24, 202.25, 128/202.27, 206.27; 340/540, 340/545.1–545.6, 546, 549; 206/216, 206/459.1; 312/327; 454/71
See application file for complete search history.

(56) References Cited

U.S. PATENT DOCUMENTS

| | | | | |
|---|---|---|---|---|
| 4,154,237 A * | 5/1979 | Courter | ................. | B64D 11/00 128/202.13 |
| 5,008,648 A * | 4/1991 | Conemac | ............... | G08B 13/08 340/546 |
| 5,078,343 A * | 1/1992 | Howlett | ................... | A62B 7/14 128/204.29 |
| 6,089,230 A * | 7/2000 | Barker | ..................... | A62B 7/08 128/202.26 |
| 7,284,763 B1 * | 10/2007 | King | ...................... | A45C 13/02 190/18 A |
| 2002/0145531 A1 * | 10/2002 | Delaney | ............... | G08B 13/149 340/689 |
| 2003/0080250 A1 * | 5/2003 | Velden | .................... | B64C 37/02 244/118.5 |
| 2005/0263156 A1 * | 12/2005 | Westphal | ............... | B64D 25/00 128/205.25 |
| 2006/0238343 A1 * | 10/2006 | Leyden | ................. | E05B 67/063 340/572.1 |
| 2008/0150676 A1 * | 6/2008 | Ennis | ...................... | B25H 3/02 340/5.1 |
| 2010/0033325 A1 | 2/2010 | Vilkomirski et al. | | |
| 2010/0288880 A1 * | 11/2010 | Bachelard | ............... | A62B 7/14 244/118.5 |
| 2011/0259789 A1 * | 10/2011 | Fan | .................... | B60R 11/0258 206/701 |

OTHER PUBLICATIONS

European Search Report in Application No. 13167630.6 dated Feb. 9, 2016, 9 pages.

* cited by examiner

CONTAINER FOR AN OXYGEN SUPPLY UNIT, DEVICE AND SYSTEM OF AN ARRANGEMENT OF A NUMBER OF OXYGEN SUPPLY DEVICES, WHEREIN EACH OXYGEN SUPPLY UNIT IS STORED IN A CONTAINER, METHOD OF CONTROL OF A STATUS AND/OR CHANGE OF STATUS OF A CONTAINER

CROSS-REFERENCE TO RELATED APPLICATION

This application claims the benefit of U.S. Provisional Application No. 61/665,534 filed on Jun. 28, 2012, the contents of which are incorporated herein by this reference.

FIELD OF THE INVENTION

The invention relates to a container for an oxygen supply unit having a container well at least, wherein a container door can be pivotally joined at a container well's edge. The invention also relates to an oxygen supply device having an oxygen supply unit stored in the container. The invention also relates to a system of an arrangement of a number of oxygen supply devices in a ceiling panel along an aircraft's cabin, in particular along an aircraft's cabin row or alley of seats, wherein in each device an oxygen supply unit is stored in a container.

BACKGROUND OF THE INVENTION

A passenger service unit as known in the state of the art are widely used in civil aircraft comprising for instance a reading light, a passenger or crew air or oxygen supply device, oxygen masks, warning lights and the like appliances. In particular an oxygen supply unit usually is part of an oxygen supply device wherein the unit is stored in a container of the aforementioned kind. In some aircrafts one passenger service unit is provided for each seat of a passenger and crew member. In other aircrafts one single passenger service unit is provided for a number of the seats, for instance in a particular for a row of seats. A row usually is aligned crosswise to an alley of seats.

Containers of oxygen supply units of the aforementioned kind usually are arranged adjacent to each other, side by side, to allow an arrangement of a number of oxygen supply devices in a ceiling-panel along an aircrafts cabin, in particular along an aircrafts cabin alley of seats. Such oxygen supply devices are referred to as OBOGS (on-board-oxygen-generating-systems) and are adapted to temporarily or continuously provide oxygen to a passenger or crew member of an aircraft. Various methods of generating oxygen are known; basically one is adapted for physically generating oxygen gas by means of an oxygen pressure cylinder and another one is adapted for chemically generating oxygen by means of a chemical oxygen generator. Thereby a certain amount of air or continuous air flow comprising a sufficient or high concentration of oxygen can be provided to a passenger or crew member.

In an emergency situation, such emergency oxygen devices in a system of an arrangement of a number of such devices are used to supply oxygen to passengers or crew members of an aircraft; in particular, emergency situations can result from a decompression situations or smoke or the like on board of the aircraft. Usually, the oxygen masks are stored above the passenger in a ceiling compartment, usually in a separate casing, like for instance the above mentioned container. In case of an emergency situation, it is to be guaranteed with sufficient reliability that oxygen masks can be released and fall out of the container. Thus, upon a door opening, the oxygen masks then are provided to the passenger at a certain level defined by means to connect the oxygen masks in the dropped state relative to the container, the oxygen generator or any other fixed point above the passenger.

Therefore, it is highly desirable to know about the status of the containers to guarantee in advance that the container will work as demanded in an emergency situation. In particular, the functioning of the container's door, in particular relative to the containers well is of particular interest. The reason is that, in an above mentioned arrangement of containers to form a passenger supply unit in an above mentioned system of an arrangement of a number of oxygen supply devices in a ceiling panel, unavoidable stress or external forces are exerted to the container. Nevertheless, it is to be prevented that stress or forces work detrimental to the functioning of the container for releasing the oxygen masks.

In particular, it is highly desirable to provide a tool for in advance knowing the status of the container with regard to the question whether the container is ready for functioning or not.

SUMMARY OF THE INVENTION

Accordingly, it is a major object of the invention to provide a container for an oxygen supply unit, wherein the status of the container is known. In particular, it is a further object to provide a container, wherein the status of the container can be indicated by a signaling. It is still a further object of the invention to provide a container, wherein additionally a relation between a container's well and a container's door is construed sufficiently reliable in working ready for an emergency case. In particular, a status control of the container should be adapted to exceptions to the rule.

The invention starts from the consideration that for a correct functioning of a container the status of the door, in particular relative to the well, of the container is highly desirable. Further, the invention has considered that the status can be monitored and the monitoring is sufficient to indicate exceptional malfunction of the container. Further, the invention has recognized that monitoring of a container status well fits into usual test procedures for supervising a correct functioning of a container in advance of an emergency situation. As a result, the inventive concept provides for a container having a container well at least, wherein a container door can be pivotally joined at a container well's edge and wherein the container is provided with a sensor system adapted to indicate a status and/or change of status of the door, in particular relative to the well.

The inventive concept can advantageously be implemented by means of particular easy and energy saving sensoring tools. In particular, the inventive concept advantageously uses existing electronic periphery. The concept has recognized that a sensor system provided can be adapted to the existing electronic periphery for further providing a signaling connection to the system of an arrangement of a number of oxygen supply devices for signaling monitoring signals of a container.

These and further developed configurations of the invention are further outlined in the dependent claims. Thereby, the mentioned advantages of the proposed concept are even more improved. For each feature of the dependent claims it is claimed independent protection independent from all other features of this disclosure.

In a particular preferred embodiment, the container door is pivotable about a hinge at the container well's edge. The hinge is preferably adapted to already provide secure functioning of the container, namely undisturbed opening of the container's door in an emergency situation, even upon stress, force or other loads exerted to the container. Preferably, the sensor system is provided fully on the door. This has some particular advantages, at first, the door is the critical security-relevant component of the container and a sensor system provided fully on the door is well-placed to monitor the functioning of the door in an opening state or during process of opening. Also, the sensor system can be placed reliably and independent of the oxygen supply unit in the container well; thus, influence or effects on the oxygen supply unit are avoided when providing the sensor system fully on the door.

In a particular preferred development, it turned out that powering of the sensor system can advantageously be provided by placing the sensor system fully on the door. It turned out that in particular energy harvesting means can be used for powering the sensor system on the door. The development recognized that, once the door is in the moving state, the motion of the door can be used for energy harvesting and for powering the sensor system. As the monitor concept of the invention is adapted to avoid superfluous signaling, an energy harvesting system can advantageously be adapted to provide energy only in the case of a malfunction of the door. A malfunction of the door, however, advantageously can be discovered during a test of functionality check wherein the door is moved or undergoes some motion at least. Kinetic energy from such or other kind of motion of the door can be used for powering the sensor system to monitor the status of the door.

In a particular preferred development, the sensor system is adapted for discriminating between a partial or complete opening of the door. The development advantageously recognizes that merely a logic YES or NO is not sufficient in most emergency systems of an aircraft. A particular reason for this is that the door functioning once in a while undergoes a test or check position, which has to be distinguished from a malfunction. On the other hand, a malfunction in an emergency situation is established by a closed door and a partial opened door. However, in an all-day situation without emergency, the correct function of the door is the closed state—nevertheless, the closed state shall not lead to superfluous monitoring signals. As a preferred development, the sensor system is adapted to signal, in particular only, firstly either a partial and static opening of the door and, in particular only, secondly a complete dynamically opening of the door. A static partial opening of the door is to be understood as a status of the door wherein the relative position of door and well remains the same for a sufficiently long span of time. Usually, the amount of opening, namely the opening angle of a pivotable door, can remain to be of a small but fixed amount. The aforementioned condition usually is indicative of a test situation. Thus, one or an accumulation of the aforementioned conditions can be advantageously used to indicate a test status of the container.

A complete dynamic opening procedure of the door is to be understood as the opening to a wide angle, in particular above 45°, and/or a dynamic status like e.g. a swinging status of the status of the door, namely an amendment of angle position in a kind of transient behaviour along a time axis which is an actual state of motion or at least has happened. These or other conditions usually indicate an emergency opening or swinging of the door. A respective signaling to a system of an arrangement of a number of oxygen supply devices can be such that those containers are indicated which—in an emergency situation—do not have the dynamic complete opening status of the door. Also here, a superfluous signaling is avoided and clearly indicates only the malfunctioning containers, i.e. those which did not open completely, rather than the correct working functioning containers.

In a particular preferred development, the sensor system comprises an opening switch adapted to sense any opening of the door, wherein the opening switch is adapted to sense any gap between the door and the well. Thus, even a loosened door with a small amount of opening angle relative to the well will be sensed by the opening switch. For instance, the opening switch can be a contact switch, a light indicating switch or the like. The switch can technically be based on an electrical principle or based on another technical principle. A preferred embodiment of a contact switch is e.g. a REED contact switch or the like contact. In particular any kind of scanner or probe is also suitable. Preferred is for instance a light barrier-based sensor or the like. Generally, a contact or opening switch can be based on mechanical, optical, magnetic or electromagnetic or electrical technology. Also any other kind of mechanical switch can be used.

In a further preferred development, the sensor system comprises a motion sensor adapted to sense the movement of the door, in particular relative to the well and/or a location or position sensor. These and other kinds of sensors are particular adapted to sense a movement of the door, in particular relative to the well. In particular, it is preferred to sense a motion of the door in the process of movement of the door. Particular preferred is a motion sensor formed as an acceleration sensor, in particular a three-axis acceleration sensor, also known as a g-sensor or the like. Particular preferred is a combination of the sensor system, in particular an acceleration sensor, with an energy harvesting means. Thus, powering of the sensor system, in particular a motion sensor, can be preferably provided by energy harvesting in the status of movement. Such kind of energy harvesting device can be provided in form of a solar cell. In particular a solar cell panel can advantageously be fixed to the outside surface of the door.

For the feature of an energy harvesting device in form of a solar cell on the container, in particular a container with an oxygen supply device having an oxygen supply unit stored in the container, it is claimed independent protection independent from all other features of this disclosure. It has been astonishingly shown up that a solar cell is well suited to work as a harvesting device. By taking advantage even from residue light at limited light levels in an aircraft's cabin— like e.g. from a reading light, incident light from outside as far as available, dimmed light etc.—still, a solar cell panel on the downside outer surface of a container as fixed in a position in a row of containers along a cabins ceiling-panel, in particular along an aircrafts cabin alley of seats, will generally provide sufficient power to allow for self-sufficient functioning of the above mentioned sensors and/or even an oxygen supply device having an oxygen supply unit stored in the container.

Particular preferred is a solar cell in form of a solar cell panel; particular advantageous is a cut solar cell panel foil; thus having sufficient energy conversion efficiency to provide for sufficient power even from residue light. A cut solar cell panel foil can be processed and be adapted to the size of the container door in a particular advantageous manner. Also a flat foil can be assembled and blended with a door blend or cover surface to allow for an aesthetic sight to the container's door downward outer surface facing when the container is in its fixed position within the row of containers.

It is to be understood that the above mentioned preferred developments of sensors to the sensor system are not restricting, but generally any kind or combination of sensors in addition to the sensors and combinations of sensors mentioned above or in alternative suitable to indicate for instance a location position and/or orientation of the door, in particular relative to the well. However, also sensor means can be provided which are able to indicate a change of status of the door independent of the well; these kind of sensor hereinafter is referred to as a status sensor. Thus, an absolute change of status of the door may also be of particular interest for monitoring the status of the door. A change of status of the door relative to the well is of particular interest for increasing the reliability of the signaling and to avoid superfluous or erroneous signaling with regard to the status of the door in advance of an emergency situation.

In a particular preferred development, the sensor system is adapted to sense any status and/or status change of the door in a region distant from the pivotable joint upon pivoting the door. Preferably a status sensor is provided on or near a pivotable joint. Preferably a status sensor is provided in a region distant from the pivotable joint. Of course, position, location and/or orientation sensors—for instance an angle sensor or a revolution counter or the like—can advantageously be provided in the pivotable or near the pivotable joint. However, in the preferred development, it turned out that advantageously the amount of change of the door is increased relative to the pivotable joint in a region distant from the pivotable joint. Thus, signaling of the status of the container can be made more reliable when taken in a region distant from the pivotable joint upon pivoting the door.

In a particular preferred development, the sensor system comprises a motion sensor and an opening switch such that discriminating of a partial or complete opening of the door is established. In a preferred first status—also referred to as a test or check status—a partial opening is indicated in the case the opening switch is in a responding state of indicating an opening of the door. Preferably the motion sensor is in a non-responding state. Additionally or alternatively preferably a status sensor is indicative of a partial opening. Thus, in the test or check status, the door is open, however not moving according to a first variant of this development and/or not fully open according to a second variant of this development. A test position of the door in a test or check status preferably is fixed and/or at rest on a latch, bolt or the like door stopper. E.g. an angle sensor indicates an angle of opening below 30° or below 40°.

Additionally or alternatively, in a second status—also referred to as an emergency status—a complete opening of the door is indicated in the case the opening switch is in a responding state of indicating an opening of the door. Preferably the motion sensor is in a responding state of indicating a door motion. Additionally or alternatively preferably a status sensor is indicative of a complete opening; e.g. an angle sensor indicates an angle of opening exceeding 30° or exceeding 40°.

In the emergency status, all containers can be indicated which are wide open with a somewhat moving or swinging door. As described above, most preferably for avoiding superfluous signaling, the aforementioned second status can be inverted in the signaling. Preferably, only the malfunctioning containers are signalized. A signal of the inverted second status can be such that a complete opening of the door is detected but not indicated and/or not signalized in the case the opening switch is in a responding state and the motion sensor is detected to be in a responding state of indicating a door motion. A signaling, however, is given if an emergency situation is present and known in a system and, additionally, a complete opening of the door signal is missing.

These and other developments are of particular advantage in view of an increased stability and improved form of the container. Particular preferred is a container as further claimed in the dependent claims. Preferably, the container well at least consists of a sheet-molded material. In particular, the container well's edge is integrally molded with a container well and/or a container door's edge is integrally molded with the container door. Thus, stability of the door and the well is particular increased and allows even respective support of the container at the container well's edge.

For a more complete understanding of the invention, the invention will now be described in detail with reference to the accompanying drawing. The detailed description will illustrate and describe what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. Further the features described in the description, the drawing and the claims disclosing the invention may be essential for the invention considered alone or in combination. In particular, any reference signs in the claims shall not be construed as limiting the scope of the invention. The wording "comprising" does not exclude other elements or steps. The wording "a" or "an" does not exclude a plurality. The wording, "a number of" items, comprises also the number one, i.e. a single item, and further numbers like two, three, four and so forth.

DETAILED DESCRIPTION OF THE DRAWINGS

Figure 1:
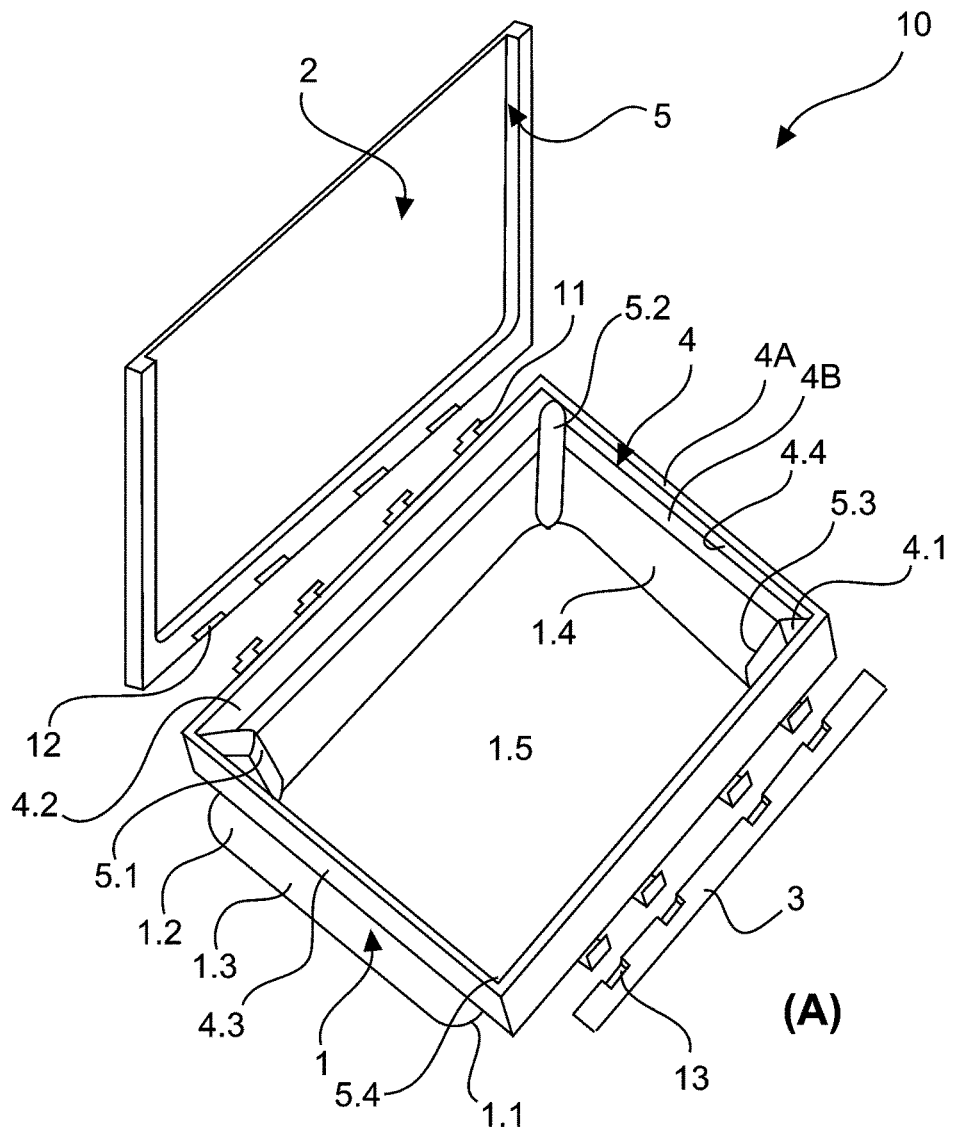
FIG. 1 an embodiment of a container for an oxygen supply unit of sheet-molded material in view (A) and a system shown in view (B)
Figure 1:
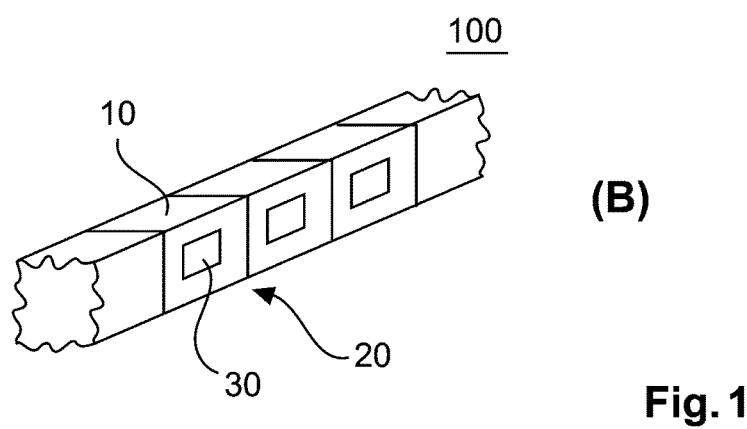

FIG. 1 shows in view (A) a container 10 for an oxygen supply unit as shown in the system 20 of view (B) in FIG. 1. In the system 20 an oxygen supply device having an oxygen supply unit 30 and the container 10 of FIG. 1 is provided. The oxygen supply unit 30 can be an oxygen pressure cylinder or a chemical oxygen generator. Also the oxygen supply unit 30 can be a chemical oxygen container combined with an oxygen pressure buffer and a downstream connected electronic or mechanical flow regulator.

The container 10 of view (A) in FIG. 1 has a container well 1 and a container door 2 and a hinge profile 3 which on the one hand is adapted to keep the door on top of the well during usual flight conditions and on the other hand for safe opening during hazardous situations when needed. Also, the hinge profile 3 is adapted for assembling the container 10 into an arrangement 100 of a number of containers for a ceiling-panel along an air-crafts cabin. Thus the arrangement 100 of containers is for providing an arrangement of a number of oxygen supply devices like the one shown schematically as system 20 in view (B) of FIG. 1 along an aircrafts cabin alley of seats. As shown by the hinge bar 11—for cooperation with hinge openings 12 and hinge openings 13 in the hinge profile 3—the container door 2 is pivotably joint at a container well's edge 4. As recognized by the inventive concept the containers well's edge 4 establishes not only sufficient stability to the container well 1 of FIG. 1 as such and thus to the container 10, but also to an arrangement 100 of containers of view (B) of FIG. 1 even when subjected to considerable stress and pressure load along an aircraft cabins elongate axis above an alley of seats. Thus the edge 4 functions as a stabilising frame for the container 10 as such. Also the edge is a load deducting element upon arrangement of the container 10 in the arrangement 100 in view (B) of FIG. 1.

In the present embodiment the container well 1 with the container well's edge 4 the container door 2 with the container door's edge 5 and the hinge profile 3 consists of a sheet-molded material. For increasing mechanical strength of the container well 1 and container door 2 both edges, namely container well's edge 4 and container door's edge 5 are integrally molded with the body of the container well and the container door respectively. The container well in particular has a front, rear and side container wall 1.1, 1.2, 1.3, 1.4 and a floor 1.5 respectively. In the present embodiment a front edge 4.1, rear edge 4.2 and side edges 4.3, 4.4 are formed by integrally molding the edges 4.1, 4.2, 4.3, 4.4 with the container well walls. Thus this results in a very high stabile version of the container well 1. In particular, on all the aforementioned sides the container edge 4 has an outer edge portion 4A extending crosswise from the walls and an inner edge portion 4B which smoothly extends from the outer edge portion 4A into the wall 1.1, 1.2, 1.3, 1.4 respectively. Thus also this construction increases static stability of the container. Moreover this construction is adapted to be easily produced within a thermoforming assisted deep-drawing molding process for the sheet-molded material. Also in the present embodiment in the transition regions 5.1, 5.2, 5.3, 5.4 between the walls 1.1, 1.2, 1.3, 1.4 depression regions are provided to further increase the static stability. Thereby as such stable and also in an arrangement 100 a container 10 with high stress resistance is provided by the concept of the instant invention and as described in the aforementioned embodiment. In particular opening of the container door 2 is guaranteed even upon mechanical load or a hazardous impact on the container 10.

It is additionally desirable to have some kind of signaling and/or monitor signal from a container for an oxygen supply unit. This has several reasons. At first, of course, in an emergency situation, it is desirable to have a clear indication—for instance by a light warning signal at the container's location—that the container is not working. Additionally, however, it is—possibly even more—important to know in advance of an emergency situation about a critical working status of the container. This can be afforded by way of continuous monitoring of the container and testing reliable working of the container during tests.

Figure 2:
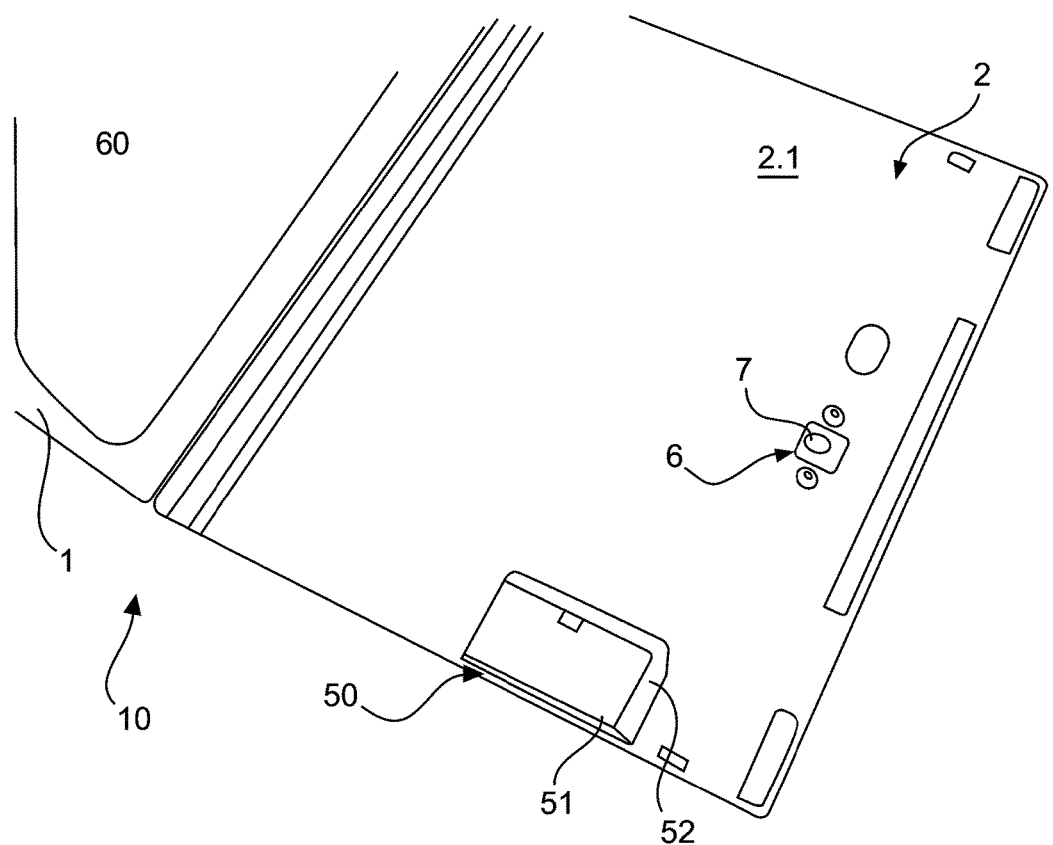
FIG. 2: a particular preferred embodiment of a container of the kind as shown in FIG. 1 with a sensor system on a door, adapted for discriminating between a partial or complete opening of the door.

The embodiment shown in FIG. 2 provides a container of the aforementioned kind with a container door pivotably joinable at a container well's edge, wherein the container is provided with a sensor system adapted to indicate a change of status of the door. The container 10 is shown in a cut-out view with the well 1 and the door 2 showing the door's 2 inside surface 2.1. The door on its inside surface 2.1 has a locking claw 6 provided with a damping element 7 which allows damped closing and opening of the door 2. Thus, test openings of the door do not functionality affect the door, and/or the well. In the well, particular in the well's floor 1.5, a trough or the like flat dimple is provided, in particular with a not shown recession or opening, to put through a signaling means. In the trough or dimple, an electrical means is provided to collect and process sensoring signals. The electrical means, like for instance a printed circuit board or the like, forms a node to a network, wherein—by means of the network—signals of all containers in the cabins are available. The printed circuit board can be connected to a sensor system 50 of the container either by means of a physical connection and signaling line or by an air interface between the sensor system 50 and the electrical means in the dimple. Thus, all sensoring signals of the sensor means 50 will be processable by the electrical means in the well and further are available to a network in an aircraft's cabin.

The sensor system 50 is provided with an opening switch 51 and a motion sensor 52. In the instant embodiment, the opening switch is formed as a photo cell which senses the difference between dark and light surrounding conditions. Thus, any—even a small—gap of opening of the door is sensed by the photocell. However, usually—if not combined with a distance measurement unit—the photocell of the opening switch 51 will not be able to sense the amount of opening of the door 2 relative to the well.

In addition, a three-axis acceleration sensor is provided as a motion sensor 52. The three-axis acceleration sensor is able to sense a moving status of the door. Thus, in the case the opening switch 51 and the motion sensor 52 both deliver a signaling of a positive response (i.e. some opening and some movement), the combination of the signaling can be used to conclude for a complete opening of the door. However, in the case the motion sensor 52 delivers a non-responding signal, whereas the opening switch 51 delivers a responding signal (i.e. some opening without movement), the combination of both signaling can be used to conclude that the door is only partially opened.

The farther situation can be indicated as a malfunction of the container during all-day use (wherein the correct status would be to have a closed container) and during an emergency situation (wherein an opened container is correct) a respective signaling can be suppressed to avoid superfluous signaling in the aircraft cabin's net.

The latter signaling usually is indicative of a test position of the container's door relative to the well. Thus, the latter signaling can be used in a test situation to be indicated as a correct functioning of the container, wherein absence of the signaling or deviating signaling in a test situation should be also indicated as a malfunctioning container. Also, during all-day situation (wherein a closed container is correct), a partially opened container should be indicated as a malfunction of the container.

Figure 3:
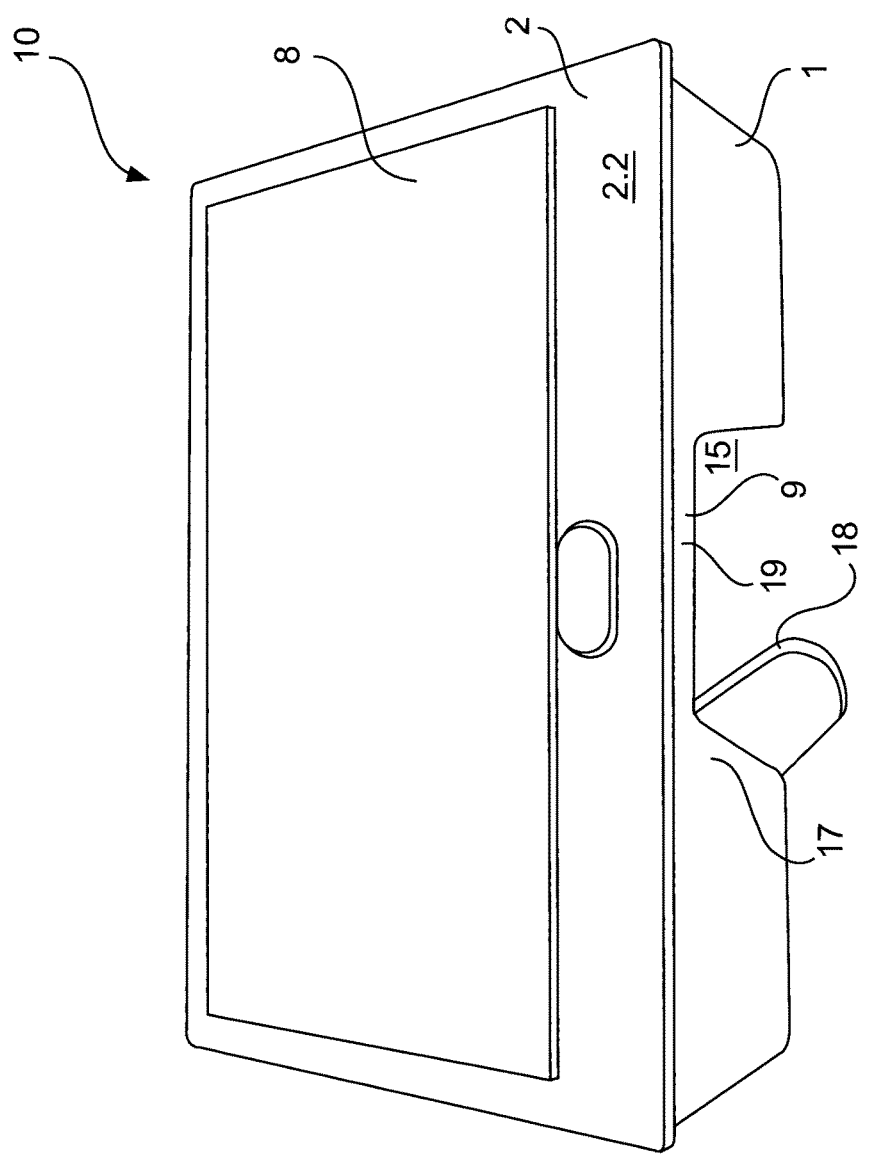
FIG. 3: a particular preferred embodiment of a container of the kind as shown in FIG. 1 and/or FIG. 2 with an energy harvesting device in form of a solar cell on the outised surface of the door.

The container 10 of FIG. 3 has a container well 1 and a container door 2 wherein the container's 10 form and constitution is similar to the container shown in FIG. 1 and FIG. 2; thus the description of the container 10 in FIG. 1 and FIG. 2 also applies to the container 10 of FIG. 3. For simplicity the same reference marks are shown with the container 10; nevertheless the containers of FIG. 1, FIG. 2 and FIG. 3 respectively may provide differences and adaptations. Here in FIG. 3 the container 10 is shown without any blends; thus the appearance of facing and colour of the container 10 of FIG. 3 may be different when in an operation position in a row of containers in a ceiling panel.

In FIG. 3 the container 10 additionally has a cut solar cell panel foil 8 adapted for conversion of residue light to electrical energy attached on the door's 2 outside surface 2.2. The cut size of the panel foil 8 is adapted to the door's 2 margins size. The solar cell's electrical outputs are connected together to an energy harvesting unit 9, which provides a battery, a storage capacitor like a super cap or the like electrical energy storage device. The connection here provides cable means 18 and a connector 17. Thus, the system of the solar cell panel foil 8 and the energy harvesting unit 9 provides an energy harvesting device for powering at least the sensor system 50, i.e. at least for powering the opening switch 51 and a motion sensor 52 in a self-sustaining manner. This means sufficient powering is guaranteed in a testing situation and/or emergency situation at least.

The energy harvesting unit 9, as shown here, is provided in an outer recess 15 of the container well 1 just beneath the container door 2—respectively (in an operation position of the container 10 as part of a row of containers on a ceiling panel) above the container door 2)—.

The harvesting unit 9 also provides for a, preferably, wireless transmitter and control unit 19 for, preferably, wireless control of the energy harvesting unit 9. Also an activation control and safe radio control can be implemented therewith.

The cable means 18 and connector 17 and harvesting unit 9 and wireless transmitter and control unit 19 can be covered in the recess 15 with a blend (not shown) of the container well 1. Also the cut solar cell panel foil 8 can be put in a suitable frame and light transparent cover which allows for both a secure fitting to the door 2 and an aesthetic face (not shown) when in operation. general method for monitoring a container of the aforementioned kind—as shown in FIG. 1 and FIG. 2—is depicted in a flowchart of FIG. 4. The flowchart holds for both a test procedure as well as an emergency procedure of use of the container. The flowchart is restricted to indicate the sensing signals of the container. However, the conclusions drawn there from depend on the situation—namely a test situation or emergency situation or an all-day use—the container is in. These and other conclusions can be processed in an application layer, for instance provided in the printed circuit board in the container well's dimple, as outlined above. Additionally or alternatively, a further evaluation—for instance a statistical evaluation of malfunctions or the like—can be provided in the aircraft cabin's net. Thus, in advance statistical evaluations for a long-term use of the container can be used to indicate risky containers. E.g. in the case when the statistics reveal that a certain container at a certain position in the aircraft's cabin has a number of malfunctioning incidents exceeding a certain threshold such container can be exchanged by a new one.

Figure 4:
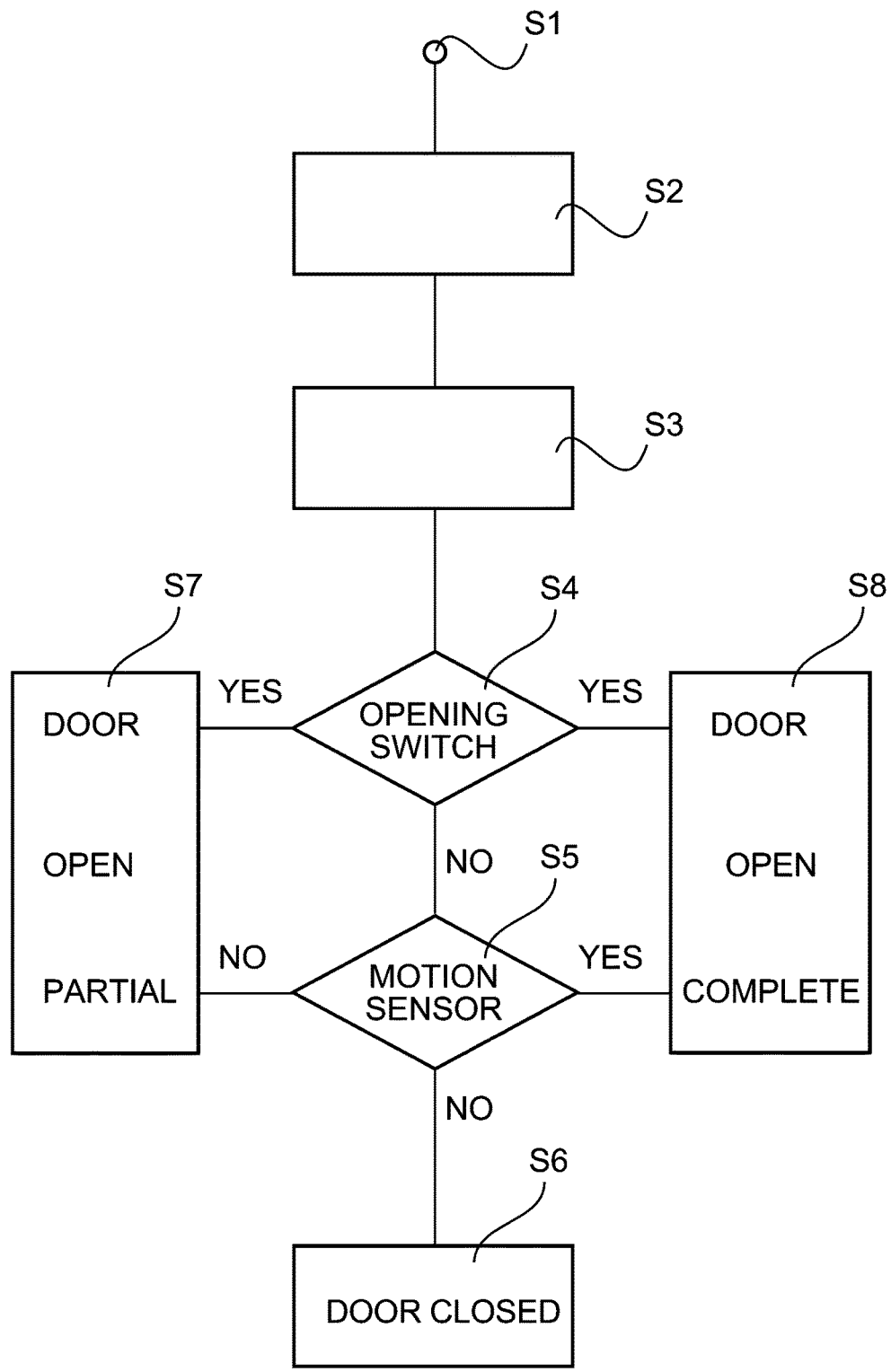
FIG. 4: a flow chart of a preferred embodiment of a method for discriminating between a partial or complete opening of the door, in particular by making use of the sensor system on a door as shown in FIG. 2.

In detail in FIG. 4 in step S1 a powering of the container—i.e. the electronics thereof, namely the printed circuit board and the sensor system—is established to make sure that all electrical components of the container have sufficient power. In step S2, an initialization of the container electronics and sensor system is provided in form of a functionality check as such of the sensors used. Thus, after step S2, in a test procedure one can be sure that the electronics and sensors of a container 10 are working correctly. In step S3, an indication of status of the aircraft cabin is provided, namely either a usual operation status, an emergency status or a test status. In step S4, the status of the opening switch 51 is recalled. In step S5, the status of the motion sensor 52 is recalled.

Given the case that none of both—the switch 51 or the sensor 52—responds, it is concluded in step S6 that the door 2 of the container 10 relative to the well 1 is closed.

In the case the opening switch 51 is in a responding state and the motion sensor 52 is in a non-responding state, it can be concluded in step S7 that the door is partially open as described above. In step S8, a complete opening of the door can be signalized in the case the opening switch 51 and the motion sensor 52 is in a responding state. The accumulation of YES or NO signaling, as indicated in the branches from steps S4 and S5 to steps S7, S8, S6, can be provided in an electronic circuit board or the like electronics 60 e.g. placed in a dimple or trough or the like, in the floor 1.5 of the container's well 1.

The statistics and/or in advance warnings for a container's malfunction can be centrally processed in a cabin's network processor or the like.

The invention claimed is:

1. A container for an oxygen supply unit, comprising:
   a. a well (i) having an edge region and (ii) configured in use to receive at least a portion of the oxygen supply unit;
   b. a movable door (i) connected to the edge region of the well and (ii) configured to move between a first state, in which the door closes the well, a second state, in which the door is fully open relative to the well, and a third state in which the door is partly open relative to the well; and
   c. means, comprising a sensor system, for detecting a state of the door from among the first, second, and third states.

2. A container according to claim 1 in which the sensor system comprises:
   a. means, comprising an opening switch, for detecting whether the door is in the first state; and
   b. means, comprising a motion sensor, for detecting whether the door is in the second or third state.

3. A container according to claim 2 in which the sensor system detects the third state by determining that (a) the opening switch fails to detect that the door is in the first state and (b) the motion sensor detects movement of the door relative to the well.

4. A container according to claim 3 in which the sensor system detects the second state by determining that (a) the opening switch fails to detect that the door is in the first state and (b) the motion sensor fails to detect movement of the door relative to the well.

5. A container according to claim 4 in which the sensor system detects the first state by determining that (a) the opening switch fails to detect any gap between the door and the well and (b) the motion sensor fails to detect movement of the door relative to the well.

6. A container according to claim 5 (a) further comprising the oxygen supply unit and (b) in which oxygen supply unit comprises at least one of an oxygen pressure cylinder or a chemical oxygen generator positioned at least partly in the well.

7. A container according to claim 1 in which the door is pivotally connected to the edge region of the well.

8. A container according to claim 1 in which the sensor system comprises a three-axis acceleration sensor.

9. A container according to claim 1 further comprising means for harvesting energy.

10. A container according to claim 9 in which (i) each of the well and door has exterior surfaces and (ii) the energy-harvesting means comprises a solar cell panel attached to at least one of the exterior surfaces of the well or door.

11. A method of monitoring a container for an oxygen supply unit, the container including a well having an edge region to which a moveable door is connected, the method comprising:
 a. detecting, using detecting means comprising a sensor system, a state of the door from among a first state, in which the door closes the well, a second state, in which the door is fully open relative to the well, and a third state in which the door is partly open relative to the well; and
 c. monitoring the detected state of the door.

12. A container for an oxygen supply unit, comprising:
 a. a well (i) having an edge region and (ii) configured in use to receive at least a portion of the oxygen supply unit;
 b. a movable door (i) connected to the edge region of the well and (ii) configured to move between a first state, in which the door closes the well, a second state, in which the door is fully open relative to the well, and a third state in which the door is partly open relative to the well; and
 c. a sensor system comprising: (i) means, comprising an opening switch, for detecting whether the door is in the first state; (ii) means, comprising a motion sensor, for detecting whether the door is in the second or third state; and (iii) means, comprising a status sensor, for detecting whether the door is in the third state.

* * * * *